Oct. 17, 1933.                W. U. WATSON ET AL                1,930,783
                                 FASTENING DEVICE
                               Filed Oct. 23, 1931
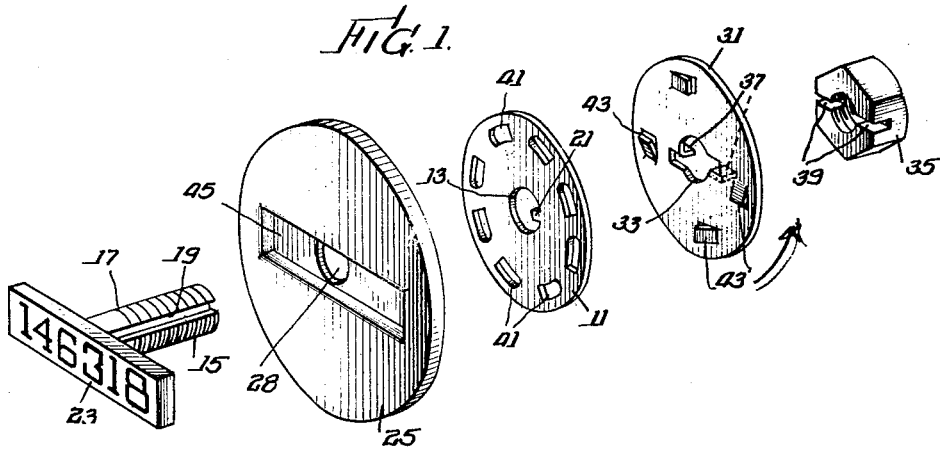
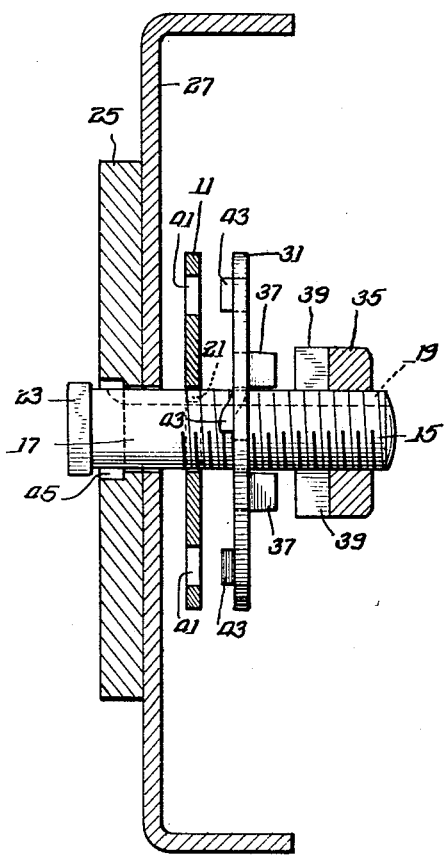
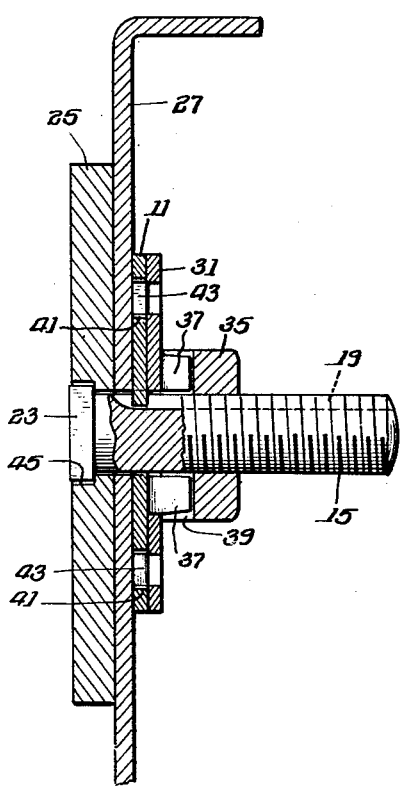
Inventors:
William U. Watson,
Joseph A. LeBouthillier,
By: Cheever, Cox & Moore
attys Patented Oct. 17, 1933

1,930,783

UNITED STATES PATENT OFFICE 1,930,783

FASTENING DEVICE

William U. Watson and Joseph A. Le Bouthillier, Chicago, Ill.

Application October 23, 1931. Serial No. 570,602

10 Claims. (Cl. 40—2.2)

Our present invention relates in general to fasteners and has more particular reference to locking devices for screw threaded members to prevent the same from becoming loosened, and the invention may be used wherever it is desired to prevent the nut or internally threaded member and the screw or externally threaded member from loosening on the work piece in which they are mounted, or formed; and, as hereinafter disclosed, the invention has particular advantages in providing a tamper-proof fastener for identification tags and the like.

Among the important objects of our present invention are to provide a tamper-proof fastener for securing identification tags and the like on automobiles and other vehicles; to provide a non-removable fastening device of the character described, which will prevent unthreading movement of the nut, bolt or cap screw of the fastening device, but it will not hinder the normal movement of the parts in applying the fastening members to clamping position; to provide a nut locking construction of novel and improved design, which will not damage the threaded portion of the fastening member but which will positively prevent unthreading movement of the parts; and to provide a locking device for threaded parts comprising two pieces, one of which may be laterally rotated with respect to the other in one direction and, which is provided with means for preventing rotation in the opposite direction to lock the parts in position.

Another important object is to provide a locking device for threadingly inter-connected members and including a part which interlockingly engages the internally threaded member whereby relative rotation therebetween is prevented, and which has an interlocking ratchet engagement with another part, which part is non-rotatable with respect to the externally threaded member, the inter-locking ratchet engagement being arranged to permit relative rotation of the parts in one direction while preventing rotation thereof in the opposite direction.

Yet another object is to provide a locking engagement for externally threaded bolts and internally threaded nuts, which consists of a plate, non-rotatably though slidably, mounted on the externally threaded bolt and a resilient plate connected to the internally threaded nut, said plates having a part forming ratchet engagement therebetween permitting rotation in one direction and preventing it in another, whereby when the nut has been threaded on the bolt, it cannot be rotated in a reverse direction to disassociate the parts.

Numerous other objects and advantages of the invention will be apparent from the following description, which taken in connection with the accompanying drawing, discloses a preferred embodiment of the invention.

Referring to the drawing:

Figure 1 is an exploded view, in perspective, of the several parts of the device of my present invention;

Figure 2 is a sectional view of the parts as applied on a support panel before the same are drawn to fully tightened position; and Figure 3 is a similar sectional view showing the parts in the position assumed when drawn up tight.

The invention comprises in general an inner lock washer 11 having a central perforation 13, to receive the threaded shank 15 of the bolt or stud 17. The shank 15 is also provided with a longitudinal groove 19 and the washer 11 is provided with a lug 21 in the opening 13, which lug is adapted to seat in the groove 19 so that the washer 11, when mounted on the shank 15 is non-rotatable though slidable upon the shank. The stud 17 is or may be provided with a head 23, which engages the part or parts 25 and 27 which are to be fastened together. The parts 25 and 27, of course, may be perforated to receive the shank 15 of the bolt and the lock washer 11 is assembled on the shank after the bolt has been inserted through the perforated parts 25 and 27, which form the work pieces to be fastened.

A second lock washer 31, having a central opening 33 to receive the shank 15 is then assembled on the shank with one of its faces in contact with the face of the washer 11. The nut 35 is then threaded onto the shank 15 and is tightened up against the washer 31 until the parts 25 and 27 are tightly clamped by and between the head 23 of the bolt and the nut 35 and lock washers 11 and 31. The lock washer 31 and the nut 35 are provided with co-operating parts, which are adapted to interengage as the nut is tightened on the shank 15 to prevent relative rotation between the washer and the nut.

In the illustrated embodiment, these co-operating parts comprise flanges 37 formed in the washer 31 and corresponding slots 39 formed in the nut to receive the projecting flanges 37 of the washer, the flanges and slots being formed in the parts in position to register with each other when the parts are assembled on the shank as aforesaid. The lock washers 11 and 31 also have co-operating formations providing a ratchet arrangement permitting the parts to be relatively rotated in one direction but preventing relative rotation in an opposite direction. To this end, the washer 11 is provided with a plurality of spaced apart perforations 41, arranged circumferentially in the washer and the washer 31 has a plurality of corresponding lips or tongues 43 pressed out therefrom in a position adapted to register with perforations 41 of the washer 11 when the parts are assembled on the shanks 15. The tongues 43 all point in the same circumferential direction and are inclined, being displaced from the plane of the washer a maximum distance at the tips of the tongues and lie in the plane of the washer at their bases. Such a construction will permit the tongues 43 to ride out of the perforations 41 when the washer 31 is rotated in a direction illustrated by the arrow in Figure 1. Reversal of this rotation, however, will result in the offset tips of the tongues 43 riding into and engaging the edges of the slots 41. In the embodiment shown, the tongues 43 and slots 41 are formed for a right hand threaded nut and bolt. For a left hand bolt, the tongues will be reversed to point in the opposite circumferential direction as will be understood by those skilled in such matters. In our invention, therefore, whether embodied in right hand or left hand screw threaded fasteners, the washer 31 and the nut 35, with which it is associated, will be prevented from rotating in a direction with respect to the washer 11 permitting unscrewing of the threaded parts, it being remembered that the washer 11 cannot rotate on the shank 15 on account of the engagement of the lug 21 in the slot 19.

This locking construction has great utility wherever it is necessary to prevent threaded parts from loosening up, as for instance, in high speed motors, such as are used in airplanes, in automobiles and other vehicles. However, we more particularly contemplate the use of our invention as a tamper-proof fastening device for securing identification tags in place. When used in this manner, the part indicated by the numeral 27 is the support member or panel on which the identification tag is mounted and the part 25 is the identification tag.

We have devised this particular fastener in order to secure an identification tag of novel construction and arrangement on the instrument board or other part, of an automobile or similar vehicle and, in the practice of our invention, we prefer to form the head 23 of the bolt in elongated rectangular form so that this part may be used to carry an identifying numeral on its face. This rectangular head also is arranged to fit into a depression 45 formed in the face of the member 25 which forms the identification tag so that the head of the bolt 23 forms an attractive element of the composite tag. The parts of the tag, which encircle the head, may carry any suitable indicia thereon.

One of the advantages of depressing the head 23 into the surface of the tag 25 is that tampering with the fastening device is thus rendered more difficult since the exposed head of the fastening member is sunk beneath the surface of the tag 25 and cannot therefore be readily grasped by an unauthorized tamperer. On the other hand, it is virtually impossible to unloosen the fastening device without obtaining a firm grip upon the head 23 and even if it were possible to obtain such a grip on the head, it would be impossible to disassociate the parts without breaking them.

The lock means of our present invention may be readily applied to all sorts of screws whether or not they are used with nuts. For instance, where a bolt is threaded into a machine part, said part may be provided with slots 39 and the lock washers applied as in the illustrated embodiment. Where the washers are used with a wooden work piece, the lugs 37 may be shaped so as to bite into the body in order to prevent relative rotation of the washer 31 with respect to said body which, in that case, becomes the internally threaded portion corresponding to the nut 35. In such an instance, if the screw is driven into the wooden body, the washer 11 will be rotated on the washer 31, the washer 11 riding up over the tongues 43 as the screw is tightened into place, but a reverse movement of the screw will be prevented on account of the ratchet engagement of the tips of the tongues 43 in the slots or perforations 41.

The invention provides a locking device of simple and inexpensive construction, which lends itself readily to commercial manufacture, since the washers 11 may be made by mass production in a punch press.

It is thought that the invention and numerous of its attendant advantages will be understood from the foregoing description and it is obvious that numerous changes may be made in the form, construction, and arrangement of the several parts without departing from the spirit or scope of our invention, or sacrificing any of its attendant advantages, the form herein described being a preferred embodiment for the purpose of illustrating our invention.

Having thus described our invention, what we claim as new and desire to secure by Letters Patent is as follows:

1. A locking device for use with an externally threaded bolt or its equivalent and an internally threaded nut or its equivalent, which is adapted to threadingly receive the bolt, said locking means comprising a washer forming a splined connection with the bolt, a second washer having connecting means co-operating with the nut at a concealed point to prevent access to the connecting means to prevent relative rotation between washer and nut, said washers having co-operating parts forming a ratchet connection permitting tightening movement of the nut on the bolt in one direction while preventing relative rotation of the nut in the opposite direction.

2. A locking device for use with an externally threaded bolt or its equivalent and an internally threaded nut or its equivalent, which is adapted to threadingly receive the bolt, said locking means comprising a washer forming a splined connection with the bolt, a second washer formed with a lug for concealed cooperation with the inner face of the nut to prevent relative rotation between the parts and to prevent tampering with the cooperating connection and destruction thereof, said washers having co-operating parts forming a ratchet connection permitting tightening movement of the nut on the bolt in one direction while preventing relative rotation of the nut in the opposite direction.

3. A locking device for use with an externally threaded bolt or its equivalent and an internally threaded nut or its equivalent, which is adapted to threadingly receive the bolt, said locking means comprising a washer forming a splined connection with the bolt, a second washer having means co-operating with the nut to prevent relative rotation therebetween, said washers having co-operating parts forming a ratchet connection permitting relative tightening movement of the nut with respect to the bolt while preventing relative unscrewing movement of the parts in the other direction, one of said washers having a plurality of perforations and the other washer having a plurality of inclined portions adapted to extend into the perforations of the first washer, the inclined portions sloping in a direction permitting the same to ride out of the perforation of the other washer when the parts are relatively rotated in one direction, said inclined portions providing locking shoulders at their extremities adapted to engage the edges of the perforation when the parts are rotated in an opposite direction to thereby prevent relative rotation between the parts.

4. An identification tag comprising a disk having a perforation and a depressed seat formed in the disk, a bolt having a head fitting in said seat and a shank extending through the perforation and means threadingly engaging the shank to secure the parts on a support member and lock washers on said shank co-operatively engaging the nut to prevent removal thereof, the head of the bolt lying in said seat in such a manner as to render same inaccessible for grasping purposes and the parts being free to turn with respect to the support whereby to make it virtually impossible to disconnect the tag from the support by tampering.

5. An identification tag comprising a disk having a central perforation, a bolt having a shank extending through said perforation and a head countersunk below the surface of the disk and threaded means engaging the shank of the bolt for the purpose of holding same on a support and the parts being free to turn with respect to the support whereby to make it virtually impossible to disconnect the tag from the support by tampering.

6. An identification tag comprising a disk having a central perforation and a seat in the face of the disk at the perforation, a bolt having a head adapted to fit in said seat and a shank adapted to extend through the perforation and clamping means carried on the shank in order to hold the parts on a support and the parts being free to turn with respect to the support whereby to make it virtually impossible to disconnect the tag from the support by tampering.

7. An identification tag comprising a disk having a central perforation, a bolt having a shank extending through said perforation and a head countersunk below the surface of the disk and threaded means engaging the shank of the bolt for the purpose of holding same on a support, said means comprising a nut, a washer forming a splined connection with the bolt, a second washer having means co-operating with the nut to prevent relative rotation therebetween, said washers having co-operating parts forming a ratchet connection permitting tightening movement of the nut on the bolt in one direction while preventing relative rotation of the nut in the opposite direction.

8. In combination with a vehicle having a perforated frame, an identification tag and means to mount same on the frame, said tag comprising a plate, said means comprising a threaded member carried by the plate with a shank extending through the perforated frame so that the plate and member are free to rotate on the frame, fastening means on the member on the opposite side of the frame and inaccessible lock means comprising a part interlockingly associated with the fastening means to rotate therewith, and a cooperating part splined on the threaded member to slide easily without rotating thereon, said cooperating parts have a portion cooperating to prevent relative rotation between the parts in one direction and being formed to offer maximum hindrance to tampering so that the parts, when assembled, cannot readily be separated without breakage.

9. A locking device for a threaded bolt and its cooperating nut comprising a pair of cooperating parts, one non-rotatable and longitudinally shiftable on the bolt and one non-rotatable on the nut, said parts having cooperating portions formed thereon in position inaccessible to tampering when the nut is tightened on the bolt and said cooperating portions permitting relative movement therebetween in a direction permitting the nut to be tightened on the bolt while preventing relative movement in a direction permitting the nut to loosen.

10. An identification tag comprising a threaded bolt, a disc carried on the bolt, threaded fastening means on said bolt for the purpose of holding same on a support, and lock means for the fastening means comprising a pair of cooperating parts, one non-rotatable and longitudinally shiftable on the bolt and one non-rotatable on the nut, said parts having cooperating portions formed thereon in position inaccessible to tampering when the nut it tightened on the bolt and said cooperating portions permitting relative movement therebetween in a direction permitting the nut to be tightened on the bolt while preventing relative movement in a direction permitting the nut to loosen, the several parts being free to turn with respect to the support whereby to make it virtually impossible to remove the tag from the support by tampering.

WILLIAM U. WATSON.
JOSEPH A. LE BOUTHILLIER.